United States Patent Office 2,794,055
Patented May 28, 1957

2,794,055

CATALYTIC HYDROGENATION OF STYRENE PEROXIDE

Glen A. Russell and Frank R. Mayo, Schenectady, N. Y., assignors to General Electric Company, a corporation of New York No Drawing. Application December 13, 1955, Serial No. 552,724

12 Claims. (Cl. 260—618)

This invention relates to the catalytic hydrogenation of styrene peroxide. More particularly, this invention relates to the preparation of phenylethylene glycol by the catalytic hydrogenation of styrene peroxide in the presence of (1) a hydrogenation catalyst and (2) an amine as basic as ammonia which is selected from the class consisting of aliphatic and cycloaliphatic amines.

It is known in the art to catalytically hydrogenate styrene peroxide to obtain phenylethylene glycol as shown in Barnes et al., "Journal of the American Chemical Society," 72, 214 (1950). However, this catalytic hydrogenation results in relatively low yield (about 30 percent) of phenylethylene glycol.

The present invention is based on our discovery that by incorporating an amine of the class described in the catalytic hydrogenation reaction, the yield of phenylethylene glycol is greatly increased over yields obtainable under comparable conditions without the amine. This result is surprising in that we have found that if styrene peroxide is first contacted with amines and the isolated reaction products then hydrogenated, the yield of phenylethylene glycol is not improved. But when the styrene peroxide is contacted with the catalyst, the amine and hydrogen at the same time, the yields of phenylethylene glycol are high.

Styrene peroxide is a material well known in the art and is the polymeric material obtained from the reaction of styrene and oxygen. Styrene peroxide is a material comprising alternating units of styrene and of the peroxide corresponding to the following formula:

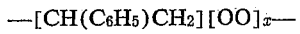
—[CH(C$_6$H$_5$)CH$_2$][OO]$_x$— where $x$ has a value of 1 or less. In the oxidation of styrene, it is sometimes difficult to add sufficient oxygen to the styrene to form the polymeric peroxide in which $x$ is equal to 1 so that most often $x$ has a value below 1, e. g., from 0.9 to 1.0. Where the value of $x$ is less than 1, the styrene peroxide has in its structure some interpolymerized styrene units along with the styrene peroxide units. In the catalytic reduction of styrene peroxide, therefore, the maximum of phenylethylene glycol which is theoretically obtainable is the amount corresponding to the number of peroxide units in the styrene peroxide. Styrene peroxide may vary at room temperature from a clear, colorless, brittle solid to a soft and sticky fluid depending on the molecular weight of the material.

Amines within the scope of the present invention include, e. g., those having the formula:

R$_1$—N—R$_3$
|
R$_2$ where R$_1$ is a member selected from the class consisting of hydrogen and alkyl radicals, e. g., methyl, ethyl, propyl, butyl, t-butyl, isobutyl, sec-butyl, decyl, etc. radicals; R$_2$ is a member selected from the class consisting of hydrogen and alkyl radicals, e. g., methyl, ethl, propyl, butyl, octyl, decyl, etc. radicals; R$_3$ is an alkyl radical, e. g., methyl, ethyl, propyl, butyl, etc. radicals; and further members where R$_2$ and R$_3$ taken together with nitrogen form a heterocyclic saturated cycloaliphatic radical containing from 4 to 5 carbon atoms in the ring.

Specific examples of amines within the scope of this invention include primary, secondary, tertiary amines, and polyamines, such as, for example, aminoethane, aminopropane, t-butylamines, aminooctane, dimethylamine, diethylamine, di-n-butylamine, methyl t-butyl amine, ethylisopropylamine, piperidine, trimethylamine, tri-n-butylamine, tri-t-butylamine, triethylamine, ethylene diamine, piperazine, etc.

The hydrogenation catalysts which may be employed in the practice of the present invention include all of these catalysts commonly employed in the hydrogenation of organic compounds. A large number of these catalysts are listed in "Catalysis Inorganic and Organic" by Berkman, et al., Reinhold Publishing Corp., New York (1940). Specifically, these catalysts are listed on pages 814–888 of the Berkman et al. book. Although all of the conventional hydrogenation catalysts may be employed in the practice of the present invention, we prefer to employ those catalysts containing a metal or a derivative of a metal from group VIII of the periodic table. Specifically, we prefer to employ catalysts containing platinum, palladium, or nickel and derivatives of these metals. These catalysts may be supported or unsupported and include, for example, platinum, platinum oxide, palladium, palladium oxide, nickel, nickel oxide, platinized nickel, and Raney nickel and Raney-type nickel catalysts. Raney nickel comprises a finely divided nickel catalyst which has been prepared by the sodium hydroxide leaching of an alloy formed of equal parts by weight of nickel and aluminum. A further description of Raney nickel is found in U. S. Patent 1,628,190, Raney and in J. A. C. S. 54, 4116 (1932) and in the textbook "Organic Synthesis," vol. 21, page 15, published in 1941 by John Wiley & Sons, Inc., New York. The term "Raney-type nickel" catalysts referred to above is intended to mean skeletal alloy catalysts which have been prepared by leaching the aluminum from an alloy comprising principally nickel and aluminum. This term of course, includes the catalyst described in the aforementioned Raney patent. In addition, the term describes catalysts which contain minor amounts of other metals in addition to aluminum and nickel. Thus, the term "Raney-type nickel catalysts" also includes the chromium modified Raney nickel catalyst described in Patent 2,502,348, Scriabine et al. which is a skeletal alloy catalyst prepared by leaching the aluminum out of an alloy containing substantially equal parts by weight of nickel and aluminum and from 0.5 to 3.5 percent by weight of chromium based on the nickel content.

The process of the present invention may be carried out by merely placing in a reaction vessel the styrene peroxide, the amine within the scope of this invention, the hydrogenation catalyst and a suitable liquid, hereinafter referred to as the "reaction medium," which dissolves or swells at least a portion of the peroxide and which is inert under the conditions of the reaction. The reaction mixture is then subjected to the action of hydrogen at an elevated pressure. The addition of the reaction medium is desirable since the styrene peroxide is either a solid or a very viscous liquid. The reaction medium is added to reduce the viscosity of the reaction mixture and allow the mixture to be stirred for more efficient hydrogenation. The character of the reaction medium is not critical so long as it does not enter into the reaction. Among the preferred reaction media employed in the process of the invention are those which act as a solvent or swelling agent for the styrene peroxide and include, for example, benzene, toluene, the xylenes, esters, e. g., ethyl acetate, methyl propionate, etc., and ethers e. g., methyl isobutyl ether, ethyl n-propyl ether, etc. In addition, mixtures of the above reaction media or mixtures of these reaction media with alcohols such as ethanol may be employed.

In carrying out the process of the present invention, the ratio of the various ingredients which are subjected to hydrogen may be varied within wide limits depending on the particular amine employed, the particular catalyst employed, and the particular reaction medium employed. However, we have found that certain ranges of compositions are satisfactory under almost any class of reaction conditions. Thus, we prefer to employ from about 1 to 50 parts by weight of the reaction medium per part of the styrene peroxide. The amount of amine present in the reaction mixture may also vary within wide limits but we prefer to employ the amine in a concentration of from about 1 to 30 percent by weight based on the weight of the styrene peroxide. The amount of catalyst employed is preferably from about 1 to 30 percent by weight based on the weight of the styrene peroxide.

A particular advantage of the process of the present invention is that it may be carried out at relatively low hydrogen pressures, e. g., pressures of about 1 atmosphere. However, we have found that the rate of reaction increases with increasing pressure and we prefer to operate with hydrogen at pressures from about 30 to 100 p. s. i. g. or higher. We have also found that our reaction may be carried out at room temperature (about 20–25° C.). However, our invention is not limited to a room temperature reaction since temperatures of from 0° C. to about 100° C. are satisfactory. Preferably we employ a temperature of from 20–60° C.

The following examples are illustrative of the practice of our invention and are not intended for purposes of limitation.

*Example 1*

A solution of 3.3 grams of styrene peroxide having a molecular weight between 1500 and 3500 and comprising essentially the repeating units,

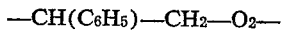
—CH($C_6H_5$)—$CH_2$—$O_2$— was added to 50 ml. of absolute ethyl alcohol. About 0.86 gram of piperidine and 0.1 gram of finely divided platinum oxide were also added. The reaction mixture was subjected to hydrogen at a pressure of 40 p. s. i. g. at 25° C. In 7 hours, 40 percent of the theoretical hydrogen had been absorbed. Another 0.1 gram of platinum oxide was added and after 16 additional hours at 25° C., 100 percent of the theoretical hydrogen had been absorbed. The reaction products were filtered to remove the solids and the filtrate was distilled to yield 68 percent of the phenylethylene glycol theoretically obtainable from the starting styrene peroxide. The phenylethylene glycol was identified from its melting point of from 64–65° C., by infrared analysis, and by a carbon hydrogen analysis which revealed the presence of 69.2 percent carbon and 7.4 percent hydrogen as compared with the theoretical values of 69.6 percent and 7.2 percent hydrogen.

*Example 2*

This example shows the low yield of phenylethylene glycol when the reaction of Example 1 is carried out in the absence of an amine. About 4.3 grams of the styrene peroxide described in Example 1 was added to 50 ml. benzene and 50 ml. ethyl alcohol. After 0.2 gram of platinum oxide had been added to the reaction mixture, the mixture was subjected to the action of hydrogen at 40 p. s. i. g. at 25° C. Over a period of 21 hours only 30 percent of the theoretical amount of hydrogen had been absorbed and analysis of the product showed it to contain only 28 percent of the amount of phenylethylene glycol theoretically available from the styrene peroxide.

*Example 3*

About 3.78 grams of the styrene peroxide described in Example 1 was dissolved in 10 ml. of benzene and 0.20 gram of triethylamine was added slowly at 0° C. over a 3 hour period. A catalyst, consisting of 0.1 gram of platinum oxide and 0.1 gram of palladium on alumina, containing 5 percent by weight of palladium based on the total weight of the palladium on alumina, was added to the reaction mixture. This reaction mixture was then subjected to the action of hydrogen at 40 p. s. i. g. at 25° C. for 15 hours. At the end of this time 60 percent of the theoretical hydrogen had been absorbed. Analysis of the reaction products showed the presence of 63 percent of phenylethylene glycol based on the theoretical amount available from the styrene peroxide.

*Example 4*

Styrene peroxide having a molecular weight of about 2500 and having a composition corresponding to the following formula

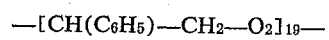
—[CH($C_6H_5$)—$CH_2$—$O_2$]$_{19}$— was added in the amount of 6.55 grams to 50 ml. of ethanol. To this reaction mixture was added 5 drops of piperidine and 0.5 gram of a chromium modified Raney nickel catalyst which had been prepared by leaching most of the aluminum from a powdered alloy consisting of 0.7 percent chromium with the remainder of the alloy being made up of substantially equal parts of nickel and aluminum. The reaction mixture was subjected to hydrogen at 40 p. s. i. g. and the temperature was increased slowly to 100° C. over the next 3½ hours during which time about 55 percent of the theoretical hydrogen was absorbed. Another 0.5 gram of the chromium modified Raney catalyst was then added and the reaction mixture was heated to 120° C. at which time further hydrogen absorption occurred over a period of about one-half hour until 95 percent of the theoretical hydrogen had been absorbed. Examination of the reaction product showed it to contain 75.5 percent of the amount of phenylethylene glycol theoretically available from the styrene peroxide.

*Example 5*

To a reaction vessel containing 60 grams of benzene and 60 grams of ethanol were added 20.0 grams of styrene peroxide having a molecular weight of about 3000 and having a composition corresponding to the following formula

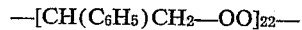
—[CH($C_6H_5$)$CH_2$—OO]$_{22}$—

Also added to the reaction mixture were 3.0 grams of the chromium modified Raney nickel described in Example 4 and 1.0 gram of t-butylamine (2-methyl-2-aminopropane). This reaction mixture was shaken without external heating, and reached a temperature of 37° C. when treated with hydrogen at a pressure which varied from about 40–60 p. s. i. g. After about 2 hours, the theoretical amount of hydrogen had been absorbed and analysis of the reaction products revealed the presence of 65 percent of phenylethylene glycol based on the amount theoretically available from the styrene peroxide.

*Example 6*

To a reaction vessel containing 60 grams of benzene and 60 grams of ethanol were added 20.0 grams of the styrene peroxide described in Example 4, 1.2 grams of the chromium modified Raney nickel described in Example 4, 0.35 gram of t-butylamine. This reaction mixture reached a temperature of 36° C. while being subjected to hydrogen at a pressure which varied from 40–60 p. s. i. g. At the end of about 2½ hours the theoretical amount of hydrogen had been absorbed and the reaction products contained about 51 percent of the theoretical amount of phenylethylene glycol avilable from the styrene peroxide.

Example 7

To a reaction vessel containing 60 grams of benzene and 60 grams of ethanol were added 19.1 grams of styrene peroxide having a molecular weight of about 3000 and having a composition corresponding to the following formula $$-[CH(C_6H_5)CH_2-OO]_{22}-$$

To this reaction vessel were also added 1.2 grams of the chromium modified Raney nickel described in Example 4 and 0.70 gram of t-butylamine. This reaction mixture warmed spontaneously to a temperature of 37° C. when subjected to hydrogen at a pressure which varied from 40–60 p. s. i. g. After 2 hours, the reaction products were examined and found to contain 61 percent of the theoretical amount of phenylethyl glycol available from the starting styrene peroxide.

Example 8

In this example the reaction mixture consisted of 60 grams of benzene, 60 grams of ethanol, 19.1 grams of the styrene peroxide described in Example 7, 3.05 grams of the chromium modified Raney nickel described in Example 4, and 0.35 gram of t-butylamine. This reaction mixture warmed spontaneously to a temperature of 38.5° C. over a period of 15 minutes and after about 3⅓ hours the theoretical amount of hydrogen had been absorbed. Examination of the reaction products showed them to contain 85 percent of the theoretical amount of phenylethylene glycol available from the starting styrene peroxide.

Example 9

To a reaction vessel containing 60 grams of benzene and 60 grams of ethanol were added 19.1 grams of the styrene peroxide described in Example 7, 3.05 grams of the chromium modified Raney nickel described in Example 4, and 0.14 gram of t-butylamine. These reactants were shaken over a 1 hour period while being maintained under hydrogen at a pressure of from 40–60 p. s. i. g. The temperature rose only to 29°. At the end of 3 hours the theoretical amount of hydrogen had been absorbed and the reaction products contained 84 percent by weight of the amount of phenylethylene glycol theoretically available from the styrene peroxide. When the procedure of this example was repeated except that the t-butylamine was omitted, at the end of 2 hours hydrogen was no longer being absorbed and only 55 percent of the theoretical amount of hydrogen had been absorbed, which shows the advantage of employing the amines of the present invention.

Example 10

To a reaction vessel were added 60 grams of benzene, 60 grams of ethanol, 19.1 grams of the styrene peroxide of Example 7, 0.35 gram of t-butylamine and 3.0 grams of commercial Raney nickel which comprises nickel which has been prepared by leaching the aluminum from a finely divided alloy of equal parts by weight of aluminum and nickel as described in the aforementioned Raney patent. This reaction mixture was shaken for 7.35 hours while being subjected to hydrogen at a pressure of from 40–60 p. s. i. g. The temperature of the reaction mixture rose to 34.5° C. soon after the reaction began. At this time 0.35 additional gram of t-butylamine was added to the reaction mixture. At the end of three additional hours, the reaction product contained 58 percent of the theoretical amount of phenylethylene glycol available from the peroxide.

Although the foregoing examples have described our invention only in terms of three specific amines, it should be understood that any amine within the class described is applicable to our process. Furthermore, only a limited number of hydrogenation catalysts have been described in the examples. It should also be understood that any of the conventional hydrogenation catalysts described may be employed and that the results obtained in the hydrogenation of styrene peroxide with any hydrogenation catalyst and an amine of the class described is superior to the corresponding result obtained using the same catalyst in the absence of the amine.

The phenylethylene glycol prepared by the process of the present invention has the utility of phenylethylene glycol prepared by any other method. Thus, this glycol may be employed as an ingredient in the preparation of alkyd resins and oil-modified alkyd resins. For example, phenylethylene glycol prepared by the method of the present invention may be mixed with a polybasic carboxylic acid such as maleic acid and a polyhydroxy compound such as pentaerythritol and an esterification catalyst such as lead oxide to form polyester or alkyd resins which are valuable in the coating art.

What we claim as new and desire to secure by Letters Patent of the United States is:

1. A method of preparing phenylethylene glycol which comprises hydrogenating styrene peroxide to phenylethylene glycol at a temperature of from 0° C. to 100° C. in the presence of a hydrogenation catalyst and an amine having the formula $$R_1-\underset{\underset{R_3}{|}}{N}-R_2$$

where $R_1$ and $R_2$ are members selected from the class consisting of hydrogen and alkyl radicals, $R_3$ is an alkyl radical, and further members where $R_2$ and $R_3$ taken together with nitrogen form a heterocyclic saturated cycloaliphatic radical containing from 4 to 5 carbon atoms in the ring.

2. The method of claim 1 in which the hydrogenation catalyst is a Raney-nickel catalyst.

3. The method of claim 1 in which the amine is piperidine.

4. The method of claim 1 in which the amine is triethylamine.

5. The method of claim 1 in which the amine is t-butylamine.

6. The method of claim 1 in which the catalyst is a chromium modified Raney nickel catalyst.

7. The method of preparing phenylethylene glycol which comprises hydrogenating styrene peroxide to phenylethylene glycol at a temperature of from 0° C. to 100° C. in the presence of a group VIII metal-containing hydrogenation catalyst and an amine having the formula $$R_1-\underset{\underset{R_3}{|}}{N}-R_2$$

where $R_1$ and $R_2$ are members selected from the class consisting of hydrogen and alkyl radicals, $R_3$ is an alkyl radical, and further members where $R_2$ and $R_3$ taken together with nitrogen form a heterocyclic saturated cycloaliphatic radical containing from 4 to 5 carbon atoms in the ring.

8. The method of preparing phenylethylene glycol which comprises hydrogenating styrene peroxide to phenylethylene glycol at a temperature of from 0° C. to 100° C. in the presence of a hydrogenation catalyst selected from the class consisting of platinum oxide, palladium, Raney nickel, and chromium modified Raney nickel and an amine having the formula $$R_1-\underset{\underset{R_3}{|}}{N}-R_2$$

where $R_1$ and $R_2$ are members selected from the class consisting of hydrogen and alkyl radicals, $R_3$ is an alkyl radical, and further members where $R_2$ and $R_3$ taken together with nitrogen form a heterocyclic saturated cycloaliphatic radical containing from 4 to 5 carbon atoms in the ring.

9. The process of claim 8 in which the amine is piperidine.

10. The method of claim 8 in which the amine is triethylamine.

11. The process of claim 8 in which the amine is t-butylamine.

12. The method of preparing phenylethylene glycol which comprises hydrogenating styrene peroxide to phenylethylene glycol at a temperature of from 0° C. to 100° C. in the presence of chromium modified Raney nickel and piperidine.

References Cited in the file of this patent

UNITED STATES PATENTS

| | | |
|---|---|---|
| 2,491,926 | Lorand et al. | Dec. 20, 1949 |
| 2,730,533 | Umhoefer | Jan. 10, 1956 |

FOREIGN PATENTS

| | | |
|---|---|---|
| 656,112 | Great Britain | Aug. 15, 1951 |
| 678,589 | Great Britain | Sept. 3, 1952 |

OTHER REFERENCES

Barnes et al.: Jour. Amer. Chem. Soc., vol. 72 (1950), page 214 (1 page; entire article pages 210–215).